(12) United States Patent (10) Patent No.: US 8,796,170 B2
Shirvanian (45) Date of Patent: Aug. 5, 2014

(54) LAYERED CATALYST

(75) Inventor: Alireza Pezhman Shirvanian, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 369 days.

(21) Appl. No.: 13/238,300

(22) Filed: Sep. 21, 2011

(65) Prior Publication Data

US 2012/0202683 A1 Aug. 9, 2012

Related U.S. Application Data

(60) Provisional application No. 61/439,512, filed on Feb. 4, 2011.

(51) Int. Cl.
| | |
|---|---|
| B01J 20/00 | (2006.01) |
| B01J 21/00 | (2006.01) |
| B01J 21/04 | (2006.01) |
| B01J 23/00 | (2006.01) |
| B01J 23/02 | (2006.01) |
| B01J 23/08 | (2006.01) |
| B01J 23/40 | (2006.01) |
| B01J 23/42 | (2006.01) |
| B01J 23/56 | (2006.01) |
| H01M 8/06 | (2006.01) |
| B01J 23/46 | (2006.01) |
| B01J 35/02 | (2006.01) |
| B01J 37/02 | (2006.01) |

(52) U.S. Cl.
CPC .............. B01J 23/42 (2013.01); H01M 8/0618 (2013.01); B01J 23/468 (2013.01); B01J 23/46 (2013.01); B01J 35/02 (2013.01); B01J 37/0215 (2013.01); Y10S 502/52712 (2013.01); Y10S 502/52713 (2013.01)

USPC ........... 502/326; 502/240; 502/300; 502/327; 502/332; 502/334; 502/339; 502/355; 502/415; 502/439; 502/527.12; 502/527.13

(58) Field of Classification Search
USPC ......... 502/240, 300, 326, 327, 332, 334, 339, 502/355, 415, 439, 527.12, 527.13
See application file for complete search history.

(56) References Cited

U.S. PATENT DOCUMENTS

| | | |
|---|---|---|
| 4,812,352 A | 3/1989 | Debe |
| 5,039,561 A | 8/1991 | Debe |

(Continued)

FOREIGN PATENT DOCUMENTS

| | | |
|---|---|---|
| EP | 1748509 A1 | 1/2007 |
| WO | 2009029539 A1 | 3/2009 |
| WO | 2009082666 A1 | 7/2009 |

OTHER PUBLICATIONS

Debe, Mark K., et al., High Voltage Stability of Nanostructured Thin Film Catalysts for PEM Fuel Cells, Journal of Power Source, 161, 2006, pp. 1002-1011.

(Continued)

*Primary Examiner* — Cam N. Nguyen
(74) *Attorney, Agent, or Firm* — Damian Porcari; Brooks Kushman P.C.

(57) ABSTRACT

A layered catalyst including a surface axis including a catalyst material layer, and a substrate material layer contacting the catalyst material layer. The catalyst material layer includes a compressed atomic distance between two adjacent catalyst atoms along the surface axis relative to an atomic distance of the same catalyst material as in bulk. The substrate material has a higher surface energy than the catalyst material. In certain instances, at least 70 percent of total atoms of the catalyst material are in a film growth mode. In certain other instances, a surface free energy of the substrate material is 1 to 50 percent greater than a surface free energy of the catalyst material. In yet certain other instances, the catalyst material layer has a d-band center in a range of −2.1 eV to −2.25 eV.

20 Claims, 5 Drawing Sheets

(56) References Cited

U.S. PATENT DOCUMENTS

| | | | | |
|---|---|---|---|---|
| 5,338,430 | A | | 8/1994 | Parsonage |
| 5,466,651 | A | * | 11/1995 | Pfefferle ............... 502/304 |
| 6,040,077 | A | | 3/2000 | Debe et al. |
| 6,052,271 | A | * | 4/2000 | Nakamura ............... 361/303 |
| 6,229,168 | B1 | * | 5/2001 | Nakamura ............... 257/295 |
| 6,232,629 | B1 | * | 5/2001 | Nakamura ............... 257/306 |
| 6,278,146 | B1 | * | 8/2001 | Nakamura ............... 257/295 |
| 6,437,966 | B1 | * | 8/2002 | Nakamura ............... 361/305 |
| 6,495,872 | B2 | * | 12/2002 | Nakamura ............... 257/295 |
| 6,576,363 | B1 | | 6/2003 | Hitomi |
| 6,794,243 | B2 | * | 9/2004 | Nakamura ............... 438/253 |
| 7,015,495 | B2 | | 3/2006 | Murata |
| 7,075,773 | B2 | * | 7/2006 | Nakamura ............... 361/305 |
| 7,351,444 | B2 | | 4/2008 | Wang et al. |
| 7,411,300 | B2 | | 8/2008 | Hu |
| 7,416,809 | B2 | | 8/2008 | Narayanan et al. |
| 7,691,780 | B2 | * | 4/2010 | Adzic et al. ............... 502/339 |
| 7,704,918 | B2 | | 4/2010 | Adzic et al. |
| 7,704,919 | B2 | | 4/2010 | Adzic et al. |
| 7,825,407 | B2 | | 11/2010 | Fujii et al. |
| 7,855,021 | B2 | | 12/2010 | Adzic et al. |
| 7,935,655 | B2 | * | 5/2011 | Tolmachev ............... 502/326 |
| 7,972,569 | B2 | * | 7/2011 | Elam et al. ............... 422/211 |
| 8,404,613 | B2 | * | 3/2013 | Adzic et al. ............... 502/184 |
| 2001/0001208 | A1 | * | 5/2001 | Nakamura ............... 257/295 |
| 2001/0002708 | A1 | * | 6/2001 | Nakamura ............... 257/295 |
| 2002/0090738 | A1 | | 7/2002 | Cozzette et al. |
| 2006/0007635 | A1 | * | 1/2006 | Nakamura ............... 361/306.3 |
| 2008/0020923 | A1 | | 1/2008 | Debe et al. |
| 2009/0247400 | A1 | | 10/2009 | Stamenkovic et al. |
| 2010/0099012 | A1 | * | 4/2010 | Adzic ............... 429/44 |
| 2010/0105548 | A1 | * | 4/2010 | Zhang et al. ............... 502/313 |
| 2010/0197490 | A1 | * | 8/2010 | Adzic et al. ............... 502/326 |
| 2010/0216632 | A1 | * | 8/2010 | Adzic et al. ............... 502/101 |
| 2011/0005921 | A1 | | 1/2011 | Brault |
| 2011/0262828 | A1 | * | 10/2011 | Noda et al. ............... 429/465 |
| 2011/0274989 | A1 | * | 11/2011 | Lu et al. ............... 429/405 |
| 2013/0085061 | A1 | * | 4/2013 | Stamenkovic et al. ....... 502/185 |
| 2013/0177838 | A1 | * | 7/2013 | Wang et al. ............... 429/524 |

OTHER PUBLICATIONS

Gancs, Lajos, et al., Crystallographic Characeristics of Nanostructured Thin-Film Fuel Cell Electrocatalysts: A HRTEM Study, Chem. Mater, 20, 2008, pp. 2444-2454.

Jacob, Timo, et al., Chemisorption of Atomic Oxygen on Pt(111) from DFT Studies of Pt-Clusters, Journal of Physical Chem B, 107, 2003, pp. 9465-9476.

Bardi, U., et al., Study of the Growth Mechanism of Platinum Layers on the Na0.7WO3(100) Single Crystal Surface, Surface Science, 162, 1985, pp. 337-341.

Kelly, Thomas G., et al., Metal Overlayer on Metal Carbide Substrate: Unique Bimetallic Properties for Catalysis and Electrocatalysis, Chem Soc. Rev., DOI: 10.1039/C2CS35165, Apr. 30, 2012, pp. 1-14.

Rettew, Robert E., et al., Layer-by-Layer Pt Growth on Polycrystalline Au: Surface-Limited Redox Replacement of Overpotentially Deposited Ni Monolayers, Journal of the Electrochemical Soc., 156, 11, 2009, pp. D513-d516.

Stamenkovic, V., et al. Surface Segregation Effects In Electrocatalysis: Kinetics of Oxygen Reduction Reaction on Polycrystalline Pt3Ni Alloy Surfaces, Journal of Electroanalytical Chemistry, 2003, (554-555), pp. 191-199.

Stamenkovic, V., et al., Surface Composition Effects in Electrocatalysis: Kinetics of Oxygen Reduction on Well-Defined Pt3Ni and Pt3Co Alloy Surfaces, The Journal of Physical Chemistry B, 2002, 106, pp. 11970-11979.

Hammer, B., et al., Electronic Factors Determining The Reactivity of Metal Surfaces, Surface Science 343, 1995, pp. 211-220.

Stamenkovic, V., et al., Improved Oxygen Reduction Activity on Pt3Ni(111) Via Increased Surface Site Availabiilty, Science, vol. 315, Jan. 26, 2007, pp. 493-497.

Ham, Dong Jin, et al., Transition Metal Carbides and Nitrides as Electrode Materials for Low Temperature Fuel Cells, Energies, ISSN 1996-1073, 2009, 2, pp. 873-899.

Elezovic, N.R., et al., Synthesis and Characterization of MoOx-Pt/C and TiOx-P/C nano-catalystes for Oxygen Reduction, Abstract Only.

Huang, Sheng-Yang, et al., Electrocatalystic Activity and Stability of Niobium-doped Titanium Oxide Supported Platinum Catalyst for Polymer Electrolyte Membrane Fuel Cells, Science Direct, Applied Catalysis B: Environmental:, Absract Only.

Koh, Shirlane, et al., The Journal of Physical Chemistry C, Structure-Activity-Stability Relationships of Pt-Co Alloy Electrocatalysts in Gas-Diffusion Electrode Layers, 2007, 111 (9), Abstract Only.

Paulus U.A., et al., Oxygen Reduction on High Surface Area Pt-based Alloy Catalysts in Comparisons to Well Defined Smooth Bulk Alloy Electrodes, Electrochimica Acta 47, 2002, pp. 3787-3798.

* cited by examiner

LAYERED CATALYST

CROSS-REFERENCE TO RELATED APPLICATIONS

This application claims the benefit of U.S. provisional application Ser. No. 61/439,512 filed Feb. 4, 2011 which is hereby incorporated by reference in its entirety.

TECHNICAL FIELD

One or more embodiments of the present invention relate to a layered catalyst.

BACKGROUND

Reliability and working lifetime are important considerations in commercializing fuel cell (FC) technologies for automotive applications. As important as catalyst durability is the catalyst activity in leading to successful commercialization of fuel cell vehicles. Development of a highly active and durable catalyst for PEMFC applications remains a key challenge.

SUMMARY

In one embodiment, a layered catalyst having a layer axis includes a substrate material layer, and a catalyst material layer contacting the substrate material layer and including a compressed atomic distance between two adjacent catalyst atoms along the layer axis relative to a counterpart catalyst material in bulk, the substrate material having a higher surface energy than the catalyst material. In certain instances, the catalyst material layer includes at least two and particularly two to five atomic monolayers of the catalyst material. In certain other instances, the substrate material layer includes at least two and particularly two to five atomic monolayers of the substrate material.

In another embodiment, at least 70 percent of total atoms of the catalyst material are in a film growth mode.

In yet another embodiment, a surface free energy of the substrate material is 1 to 50 percent greater than a surface free energy of the catalyst material.

In yet another embodiment, the catalyst material layer has a d-band center in a range of −2.1 eV to −2.25 eV.

In yet another embodiment, the layered catalyst includes a surface-to-thickness aspect ratio of 5 nanometers (nm) to 130 nm.

In yet another embodiment, the layered catalyst further includes a support structure supporting the catalyst and substrate material layers.

In yet another embodiment, the catalyst material includes platinum in an atomic weight percent of no less than 5 percent.

In yet another embodiment, a catalyst includes a number of catalyst particles each including a layered catalyst supported on a support structure, the layered catalyst including a catalyst material in one or more atomic monolayers contacting a substrate material in one or more atomic monolayers, wherein the substrate material has a higher surface energy than the catalyst material, and the catalyst material as present in the one or more atomic monolayers has an atomic distance smaller than an atomic distance of the catalyst material in bulk.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
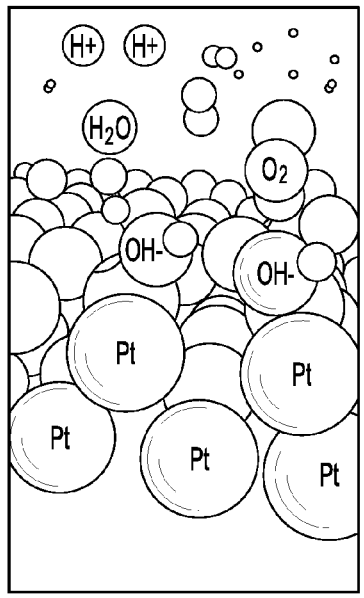
FIG. 1A illustratively depicts atomic arrangement in a pure platinum catalyst and interactions between the platinum atoms and the surrounding various oxygen species as reactants.

FIG. 1A illustratively depicts a prior art atomic arrangement in an all platinum (Pt) catalyst and interactions between the platinum atoms and the surrounding various oxygen species as reactants. The platinum catalyst may include all platinum atoms or platinum nickel (Ni) alloys such as $Pt_3Ni$. These oxygen species, including oxygen molecules and hydroxyl groups, tend to adhere or in certain instances get absorbed onto the outer surface layers of the platinum atoms.

Figure 1B:
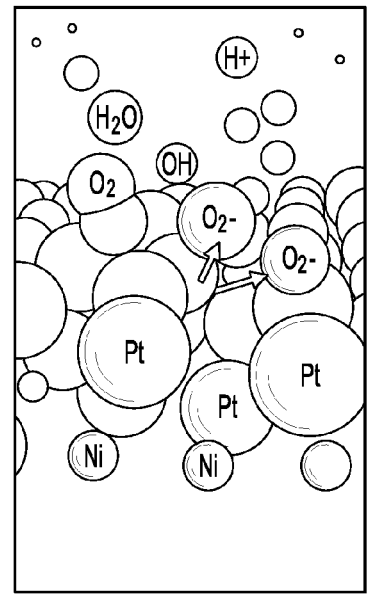
FIG. 1B illustratively depicts atomic arrangement in a platinum and nickel alloy and interactions between the platinum atoms and the surrounding various oxygen species as reactants.

FIG. 1B illustratively depicts a prior art atomic arrangement in a platinum nickel alloy ($Pt_3Ni(111)$ alloy) and interactions thereof with the surrounding various oxygen species as reactants. Without wanting to be limited to any particular theory, it is believed that the $Pt_3Ni(111)$ alloy as depicted in FIG. 1B tends to grab hydroxides and/or atomic oxygen less firmly than the Pt(111) catalyst as depicted in FIG. 1A, leaves more surface sites for oxygen dissociation, and hence a greater catalytic activity. Upon being suitably annealed, the Pt atoms and the Ni atoms no longer stay in a homogeneous form, but rather form a Pt rich surface with Pt and Ni underneath the surface with different proportions in each underlying layer.

If surface interactions are too strong, adsorbates practically contaminate the surface of catalyst, thereby preventing oxygen dissociation reaction from taking place. These adsorbates may include atomic oxygen resulting from oxygen dissociation reactions and hydroxyl groups. On the other hand, if surface interactions are too weak, effective surface reactions may be reduced and loss of catalytic activity will result.

The present invention in one or more embodiments as described herein is believed to provide a solution to and/or an improvement of at least one of the difficulties associated with the employment of the prior art catalysts.

Figure 2:
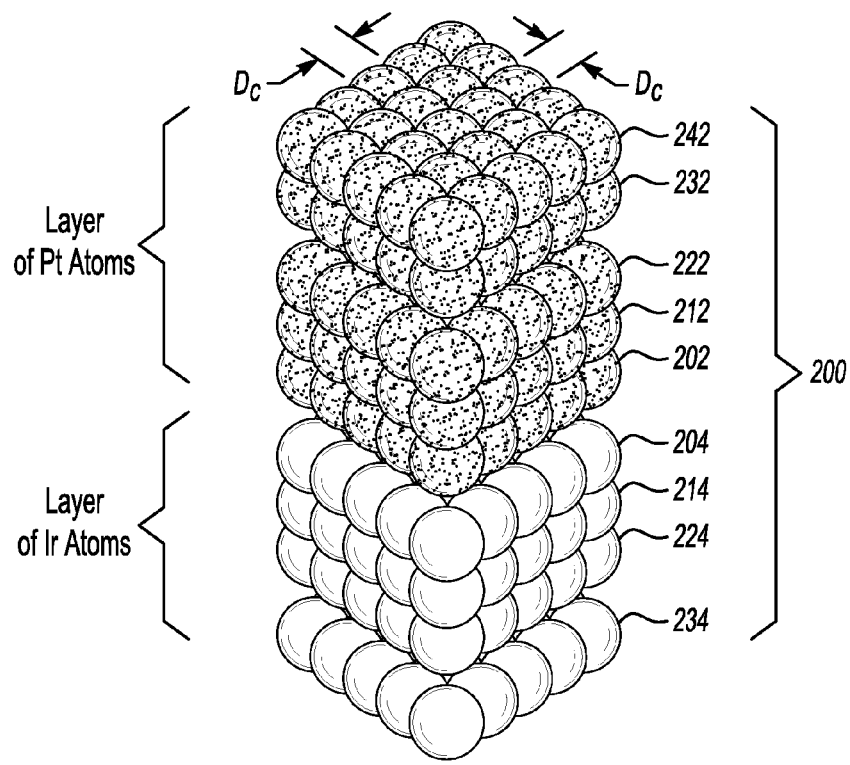

In one embodiment, and as depicted in FIG. 2, a layered catalyst 200 includes a catalyst material in one or more atomic monolayers 202, 212, 222, 232, 242 contacting a substrate material in one or more atomic monolayers 204, 214, 224, 234, wherein the substrate material includes a higher surface energy than the catalyst material, and the catalyst material as present in the one or more atomic monolayers 202, 212, 222, 232, 242 has an atomic distance "Dc" smaller than an atomic distance of the catalyst material in bulk. Without wanting to be limited to any particular theory, it is believed that a relatively higher surface energy in the substrate material and relatively lateral compression in the catalyst material together result in a synergistic improvement in electrochemical performance. In certain particular instances, the substrate material includes Ir. Atomic layers of Pt may be arranged on Ir to form the (111) crystalline phase or any other suitable crystalline orientations, including the (110) facet and/or the (100) facet.

In one or more embodiments, the term "monolayer" refers to a single, closely packed layer of atoms or molecules.

In certain instances, the layered catalyst includes two or more atomic monolayers of the catalyst material. In certain particular instances, the layered catalyst includes two to five monolayers of the catalyst material. In certain other instances, the layered catalyst includes two or more atomic monolayers of the substrate material. In certain other particular instances, the layered catalyst includes one to five monolayers of the substrate material.

In one or more embodiments, the atomic distance "Dc" of the catalyst material refers to a distance between the atomic centers of two adjacent atoms on a particular monolayer such as any one of the monolayers 202 to 242 illustrated in FIG. 2. By way of example, platinum in bulk has a general atomic distance of about 2.77 angstroms; in comparison, atomic distance "Dc" of platinum according to one or more embodiments of the present invention may be reduced to a value smaller than 2.77 angstroms, to effect lateral compression. In certain instances, the atomic distance "Dc" in the example of platinum may have a value of 2.75, 2.72, 2.70 or 2.67 angstroms.

Without wanting to be limited to any particular theory, it is believed that the relatively greater surface energy of the substrate material induces and facilitates "wetting" of the catalyst material as the latter is being deposited on the substrate material. This wetting is more effective as seen between the immediate contacting layers 202 and 204. The wetting effect may gradually decrease towards the outer catalyst material outer layers. For instance, it may be seen that the innermost catalyst material monolayer 202 may have relatively more film-mode growth than the outermost catalyst material monolayer 242, with the immediate monolayers 212, 222, 232 positioned somewhere in between.

In certain instances, at least 70 percent, 80 percent, 90 percent, 95 percent of total atoms of the catalyst material are in a film-mode growth. In certain other instances, at least 70 percent, 80 percent, 90 percent, or 95 percent of the total surface area of any one of the atomic monolayers 202 to 242 is presented with catalyst atoms formed via film-mode growth.

In one or more embodiments, the term "film-mode growth" refers to atomic arrangement otherwise known as the "Frank-van der Merwe" growth, which is a growth mode of two dimensional layer-by-layer growth in contrast with three dimensional growth with islands otherwise known as the "Volmer-Weber" growth or "Stranski-Krastanov" growth.

In yet another embodiment, a surface free energy of the substrate material is 1 to 60 percent greater, 5 to 50 percent greater, 5 to 45 percent greater, 5 to 40 percent greater, 5 to 35 percent greater, 5 to 30 percent greater, 5 to 25 percent greater, or 5 to 20 percent greater, than a surface free energy of the catalyst material.

In yet another embodiment, the catalyst material, as present in the one or more atomic monolayers 202, 212, 222, 232, and/or 242, has a d-band center in a range of −2.1 eV to −2.25 eV.

Figure 2A:
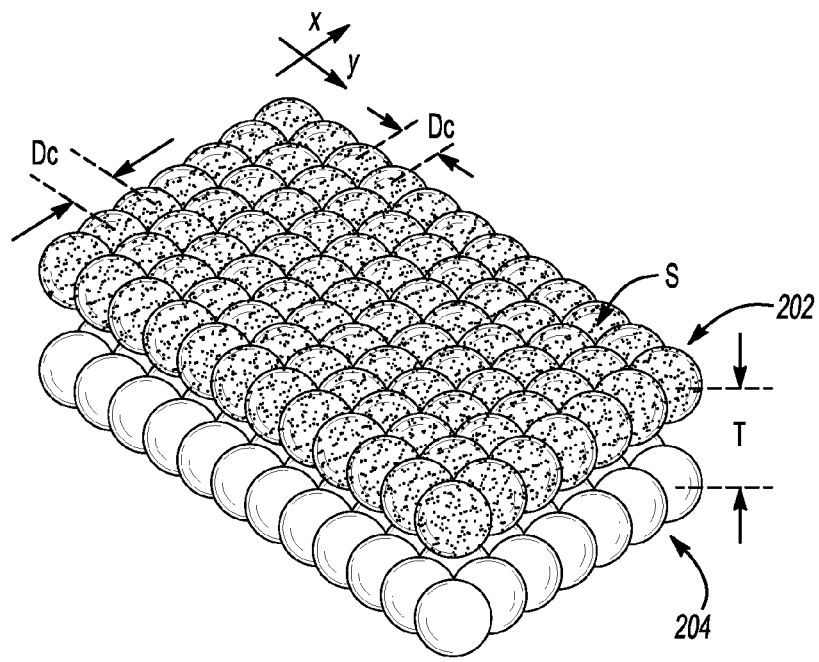

A more expanded perspective view of the catalyst material monolayer 202 and the substrate material monolayer 204 is depicted in FIG. 2A, wherein the layered catalyst 200 is shown to have a surface axis in the form of an x axis and/or a y axis. In the interest for brevity, only monolayers 202 and 204 are depicted in FIG. 2A. However, it is appreciated that along the thickness "T" direction, the layered catalyst 200 may have any suitable number of the catalyst monolayers and/or any suitable number of the substrate monolayers. The layered catalyst 200 may have a surface-to-thickness (S/T) aspect ratio of greater than 5 nm. In certain instances, the S/T aspect ratio is greater than 10, 25 nm, 50 nm, 100 nm, 500 nm, or 1,000 nm. In certain instances, the S/T aspect ratio may be of between 5 nm to 130 nm, 10 nm to 120 nm, 25 nm to 110 nm, or 50 nm to 100 nm. In the simplest form, the surface "S" may be determined by the product of the dimension value in x and the dimension value in y. For instance, the layered catalyst 200 may have a S/T value of 90 nm, wherein the x and y are each 30 nm and the catalyst thickness "T" is 10 nm.

Figure 2B:
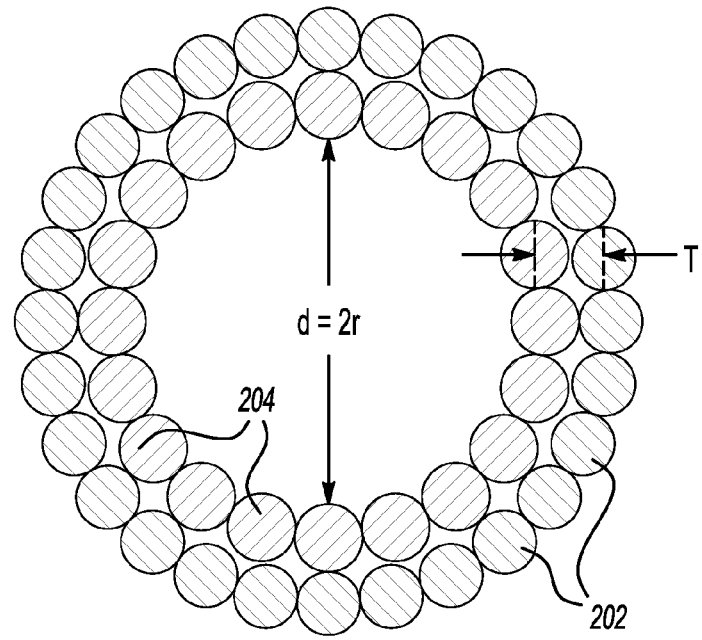

The catalyst layer with thickness "T" contacting a substrate of diameter "d" is illustratively shown in FIG. 2B. Curvature, defined as reciprocal of the radius "r", is chosen to be small enough (or the value of "r" be large enough) so as to avoid offsetting the compression intended in the catalyst layer. In one or more embodiments, an average value of the diameter "d" may be of between 5 nm to 100 μm, 25 nm to 75 μm, 50 nm to 50 μm, 75 nm to 25 μm, 100 nm to 10 μm, 200 nm to 5 μm, or 500 nm to 1 μm. These values present a clear departure from conventional particle dimensions of between 1 to 5 nm, corresponding to tremendous curvature.

In yet another embodiment, the catalyst material includes platinum in an atomic weight percent of no less than 70 percent, 75 percent, 80 percent, 85 percent, 90 percent, or 95 percent. These ratios are for the catalyst material, not for the entire composition including the substrate. In the extreme wherein the catalyst material is a layer of pure Pt atoms, the Pt percent should be somewhere near 100%. In certain instances, the catalyst material includes less than 95 atomic weight percent of transition metals such as Ni, Co, Mo, Cr, W, Zr, Mn, Fe, rh, Ru, Os, Re, Ta, Nb, V, and/or Ti.

In yet another embodiment, a catalyst includes a number of catalyst particles each including a layered catalyst supported on a support structure, the layered catalyst including a catalyst material in one or more atomic monolayers contacting a substrate material in one or more atomic monolayers, wherein the substrate material has a higher surface energy than the catalyst material, and the catalyst material as present in the one or more atomic monolayers has an atomic distance smaller than an atomic distance of the catalyst material in bulk.

The catalyst material may include one or more of the precious metals including platinum (Pt), gold (Au), osmium (Os), palladium (Pd), rhenium (Rh), and ruthenium (Ru), and combinations thereof. In certain instances, the catalyst material includes platinum.

The substrate material may include one or more of any suitable elements that have a surface free energy value greater than that of the catalyst material. Non-limiting examples of the substrate material include Mo, Nb, Tc, Rh, Ru, Ir, Ta, W, Re, Os, V, Fe, and combinations and oxides thereof. In certain instances, the substrate material includes iridium (Ir).

Surface free energy may be determined via the equation $$\gamma = \frac{dW}{dA},$$

wherein the thermodynamic quantity, Gamma, represents the reversible work needed to generate a unit area of surface at constant temperature, volume and chemical potential. Non-limiting examples of surface free energy values at temperature of 373K include Pt of about 2490 millijoules (mJ)/cm$^2$, Mo of about 2899 mJ/cm$^2$, Nb of about 2648 mJ/cm$^2$, Rh of about 2690 mJ/cm$^2$, Ru of about 2987 mJ/cm$^2$, Ta of about 2998 mJ/cm$^2$, W of about 3244 mJ/cm$^2$, Os of about 3444 mJ/cm$^2$, Ir of about 3040 mJ/cm$^2$, V of about 2540 mJ/cm$^2$, Pd of about 2040 mJ/cm$^2$, Ti of about 2002 mJ/cm$^2$, and Ni of about 2375 mJ/cm$^2$.

The d-band center values and the surface free energy values may be considered independent of each other. Without wanting to be limited to any particular theory, it is believed that with the d-band values suitable catalytic activities regarding a particular set of the catalyst and substrate may be determined; and with comparative surface free energy values preferable thin film growth of the catalyst atoms may be secured over a particular substrate material.

In one or more embodiments, d-band center analysis may be employed to characterize the adsorption properties of different species on d-band metals. B. Hammer, J. K. Nørskov, Surf. Sci. 343 (1995) 211 provides a good reference for d-band center analysis, the entire contents thereof are incorporated herein by reference.

Figure 3A:
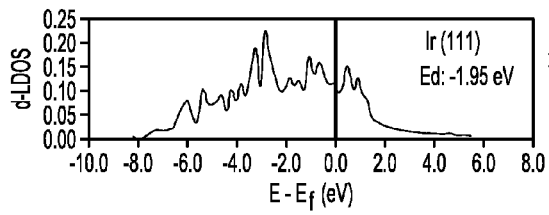
FIG. 3A shows the d-band center for pure Ir(111) as −1.95 eV.
Figure 3E:
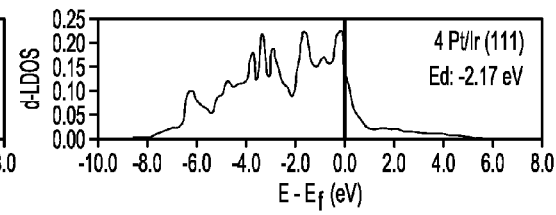
FIG. 3E shows the d-band center for four Pt layers on Ir as −2.17 eV.
Figure 3B:
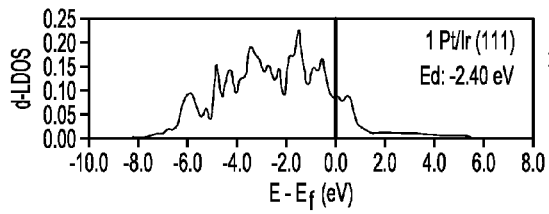
FIG. 3B shows the d-band center for one Pt layer on Ir as −2.4 eV.
Figure 3F:
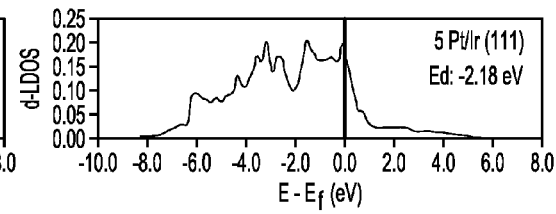
FIG. 3F shows the d-band center for five Pt layers on Ir as −2.18 eV.
Figure 3C:
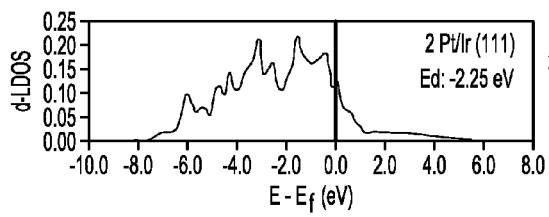
FIG. 3C shows the d-band center for two Pt layers on Ir as −2.25 eV.
Figure 3G:
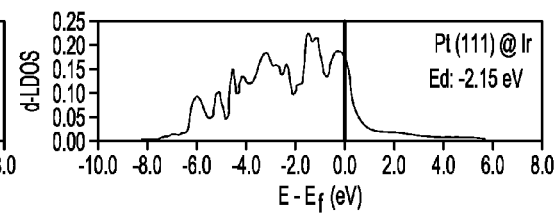
FIG. 3G shows the d-band center for Pt layers compressed to Ir lattice as −2.15 eV.
Figure 3D:
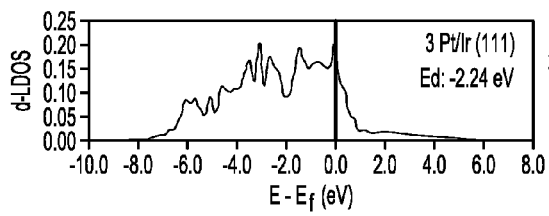
FIG. 3D shows the d-band center for three Pt layers on Ir as −2.24 eV.
Figure 3H:
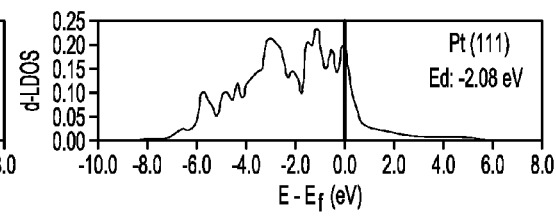
FIG. 3H shows the d-band center for pure Pt(111) as −2.08 eV.

FIGS. 3A to 3H depict the location of d-band centers of various catalyst constructions. FIG. 3A shows that the d-band center for pure Ir(111) is −1.95 eV. FIG. 3B shows that the d-band center for one Pt layer on Ir is −2.4 eV, a lower value than that for pure Ir(111) of FIG. 3A. The d-band analysis may not necessarily be limited to the material type being used. The d-band values may vary by the number of Pt layers and/or the type of substrate used. FIG. 3C shows the d-band center for two Pt layers on Ir is −2.25 eV, an even lower value. FIG. 3D shows the d-band center for three Pt layers on Ir is −2.24 eV, a value comparable to that of the two Pt layers on Ir of FIG. 3C. FIG. 3E shows the d-band center for four Pt layers on Ir is −2.17 eV, a value comparatively lower than the ones shown in FIGS. 3C and 3D. FIG. 3F shows that the d-band center for five Pt layers on Ir is −2.18 eV, a value comparable to the one shown in FIG. 3E. FIG. 3G shows the d-band center for Pt layers compressed to Ir lattice is −2.15 eV. For compressing the Pt layers, one could use sputtering, vapor deposition, and/or atomic layer deposition (ALD) to achieve the compression. Ir lattice constant is 2.72 Angstroms while Pt lattice constant is 2.77 Angstroms, both in bulk surfaces. The term "lattice constant" may refer to distance between two adjacent atoms. FIG. 3H shows the d-band center for pure Pt(111) is −2.08 eV, a value higher than any of the values shown in FIGS. 3B to 3G.

Figure 4:
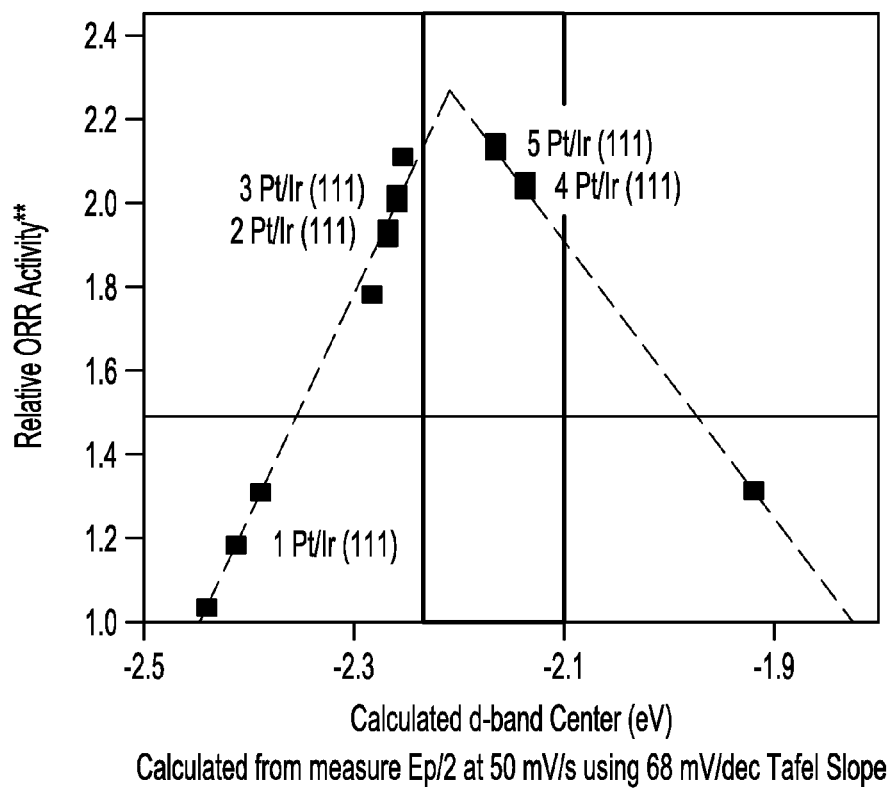
FIG. 4 shows relative ORR (oxygen reduction reaction) activities as a function of various calculated d-band center values.

Relative ORR activities for the catalyst constructions referenced in FIGS. 3A to 3H are calculated using computational methods and are located in the plot shown in FIG. 4 showing relative ORR activities as a function of calculated d-band center. Computational methods may include density functional theory (DFT). In these calculations, RPBE (GGA) is used for calculating exchange correlation. Spin polarization is included. DZ (double zetta) local basis is used for all atoms. Data points fall within the bolded box are believed to correspond to desirable electrochemical features and catalytic activities. As depicted in FIG. 4, 5 Pt/Ir(111) of FIG. 3F and 4Pt/Ir(111) of FIG. 3E are believed to have desirable ORR activities based on calculated d-band centers. Comparatively, pure Pt(111), 2Pt/Ir(111) and 3Pt/Ir(111) are of acceptable ORR activities, while the ORR activity for 1Pt/Ir(111) is relatively less.

In one or more embodiments, the catalyst atoms grow on the substrate material as layers of 2-dimensional (x, y) extensive film with a thickness dimension (e.g., z direction) of 1 to 20 atomic layers, 2 to 16 atomic layers, or 3 to 10 atomic layers. Without wanting to be limited to any particular theory, it is believed that the 2-dimensional extensive catalyst film is both structurally and functionally different from conventional catalyst nano-particles or catalyst alloys, wherein catalyst atoms aggregate and form particles by themselves or with other alloy partners to be stable.

Figure 5:
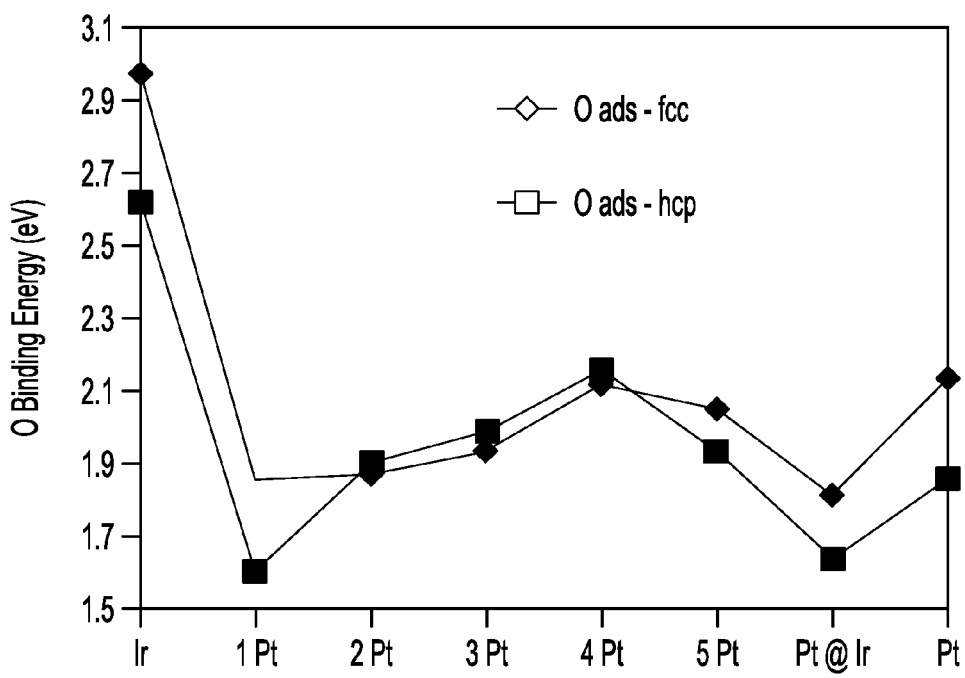
FIG. 5 shows oxygen binding energy in eV corresponding to various catalyst structures referenced in FIGS. 3A to 3H in their "fcc" arrangement (the line with diamonds) and "hcp" arrangement (the line with squares)

As depicted in FIG. 5, the line with diamonds shows oxygen binding energy in eV corresponding to various catalyst structures referenced in FIGS. 3A to 3H in their "fcc" surface site arrangements. The line with squares shows oxygen binding energy in eV corresponding to various catalyst structures referenced in FIGS. 3A to 3H in their "hcp" surface site arrangements. Without wanting to be limited to any particular theory, it is believed that the catalysts in "fcc" arrangements tend to absorb oxygen more firmly than their "hcp" counterparts. "hcp" and "fcc" sites are believed to be geometrically different, and hence electronically and catalytically different. In "hcp" site, for instance, there is one atom positioned directly beneath the site in the second layer; while in "fcc" site, there is no atom directly beneath the site in the second layer. However, in both arrangements as depicted in FIG. 5, addition of one or more Pt layers on Ir support appears to substantially lower the oxygen binding energy in comparison to the pure Ir support, and also appears to lower the oxygen binding energy even in comparison to the pure Pt(111) construction.

In one or more embodiments, the present invention is advantageous in that relatively less loading of catalyst material may be used to elicit comparatively acceptable catalytic activities. In addition, the number of catalyst material layers can be varied to obtain a catalytic activity suitable for a particular application at hand. In this regard, the cost associated with the amount of catalyst loading may be balanced against the amount of catalytic activity one is seeking. As a result, more flexibility is provided to the catalyst design.

In one or more embodiments, the present invention is advantageous in that established methods are readily available to deposit one or more layers of a catalyst material onto a substrate material. In this regard, troublesome annealing process as used in the art may be avoided altogether, although not impermissible as a way of arranging the catalyst and substrate materials in the present invention. Pt₃Ni-skin, a known catalyst for instance, must be annealed via complex annealing procedures and parameters to gain catalytic activities directed to the outermost surface layers, which are structurally pure Pt layers but not a combination of Pt and Ni, as exposure of Ni to a corrosive electrochemical environment may be detrimental to the catalyst integrity and activity. In contrast, for Pt/Ir according to one or more embodiments of the present invention, Pt can be readily deposited onto Ir as thin layers to avoid the exposure of Ir atoms, and at the meantime, the deposition of Pt is synergistically facilitated by both the favorable surface free energy differential between the Pt and Ir atoms. The electronic interactions between Pt and Ir, in addition to lattice compression of Pt due to the presence of Ir support layers, makes this interaction catalytically more active towards ORR as demonstrated by the d-band center of the Pt/Ir layered complex. In this regard, Pt cannot be readily deposited as a thin film onto a Ni support as Ni has a lower surface free energy than Pt and therefore, the resultant surface free energy differential is not in favor but is against the thin film growth of the Pt layers.

In one or more embodiments, the present invention is advantageous in that various combinations of the catalyst material and the substrate material may be selected based on their d-band centers as the d-band centers are believed to correlate to ORR activities and hence performance in electrochemical cells such as fuel cells. For instance, and as described herein, a catalyst of 5 Pt layers on Ir referenced in FIG. 3F has a d-band center in the neighborhood of −2.18 eV, a value corresponding to desirable ORR activities.

In one or more embodiments, the present invention is advantageous in that the pairing between the catalyst material and the substrate material can be selected such that the catalyst material, upon deposition, grows to form a thin film, in a two-dimensional layer-by-layer growth manner. This selection may be based on respective surface free energies of the catalyst and substrate materials. For instance, surface free energies for Ir and Pt are respectively 3100 mj./cm² and 2550 mj./cm². As a result, Pt is believed to form a two-dimensional extensive thin film upon deposition onto Ir. In this regard, Pt may grow according to the Frank-van der merwe (FV) mode of growth or layer by layer growth. In other words, Ir atoms have higher surface free energies to "pull" the Pt atoms, or conversely, that Pt wets the surface of Ir.

The catalyst of one or more embodiments may be applicable to the thin film mesh catalyst (TFMC) described in the U.S. patent application Ser. No. 12/770,084, entitled "catalyst layer having thin film nanowire catalyst and electrode assembly employing the same," filed Apr. 29, 2010, the entire contents thereof being incorporated herein by reference.

The catalyst of one or more embodiments may be applicable to the thin film array catalyst (TFAC) described in the U.S. patent application Ser. No. 12/770,277, entitled "fuel cell electrode assembly and method of making the same," filed Apr. 29, 2010, the entire contents thereof being incorporated herein by reference.

Any suitable methods can be employed to deposit the catalyst material and to control the number and/or the extent of growth of the atomic layers of the catalyst material. Non-limiting examples of the deposition methods include atomic layer deposition (ALD), chemical vapor deposition (CVD), physical vapor deposition (PVD), and under-potential deposition (UPD).

ALD (atomic layer deposition) may be self-limiting in that the amount of film material deposited in each reaction cycle is constant. ALD is similar in chemistry to CVD (chemical vapor deposition), except that the ALD reaction is believed to break the CVD reaction into two half reactions, keeping the precursor materials separate during the reaction. Due to the characteristics of self-limiting and surface reactions, ALD film growth makes atomic scale deposition control possible. By keeping the precursors separate throughout the coating process, atomic layer control of film growth may be obtained as fine as approximately one monolayer of atoms, or approximately 3 Angstroms.

Each reaction cycle adds a given amount of material to the surface, referred to as the growth per cycle. To grow a material layer, reaction cycles are repeated as many as required for the desired film thickness. One cycle may take time from half a second to a few seconds and deposit between 0.1 and 3 angstroms of film thickness. Before starting the ALD process, the surface is stabilized to a known, controlled state, usually by a heat treatment. Due to the self-terminating reactions, ALD is a surface-controlled process, where process parameters other than the precursors, substrate, and temperature may have little or no influence. And, because of the surface control, ALD-grown films can be expected to be greatly conformal and uniform in thickness.

Using ALD, film thickness may only be variable to the number of reaction cycles, which makes the thickness control relatively accurate and simple, with little to no dependence on reactant flux homogeneity. ALD is also adaptable to a wide range of film materials and can be operated under relatively low temperatures.

EXAMPLES

Example 1

Building a Pt/Ir catalyst. Computational calculations are carried out with the use of ADF/BAND (Amsterdam Density Functional) software, which may be available from Scientific Computing & Modeling of the Netherlands. In these calculations, RPBE (GGA) is used for calculating exchange correlation. Spin polarization is included. DZ (double zetta) local basis set is used. Innermost atomic shells are frozen. Relativity effects are accounted for using first order perturbation theory. A four-layer thick Ir slab is used, of which the top two layers are relaxed and the bottom two layers are fixed in bulk. For Pt (111) layers, 1 to 5 layers of laterally compressed Pt are on the Ir support, wherein all layers are relaxed. The term "fixed in bulk" may refer to the arrangement wherein atomic distances between layers are frozen to their bulk value. The term "layered relaxed" may refer to the arrangement wherein atomic distances between layers are allowed to vary so the DFT optimizer can find the optimal value between layer distances. The term "four layer thick slab of Ir" may refer to four monolayers of Ir, with some of the monolayers fixed in bulk while top layers are relaxed. This slab is used to represent the bulk Ir substrate.

Example 2

Figure 6:
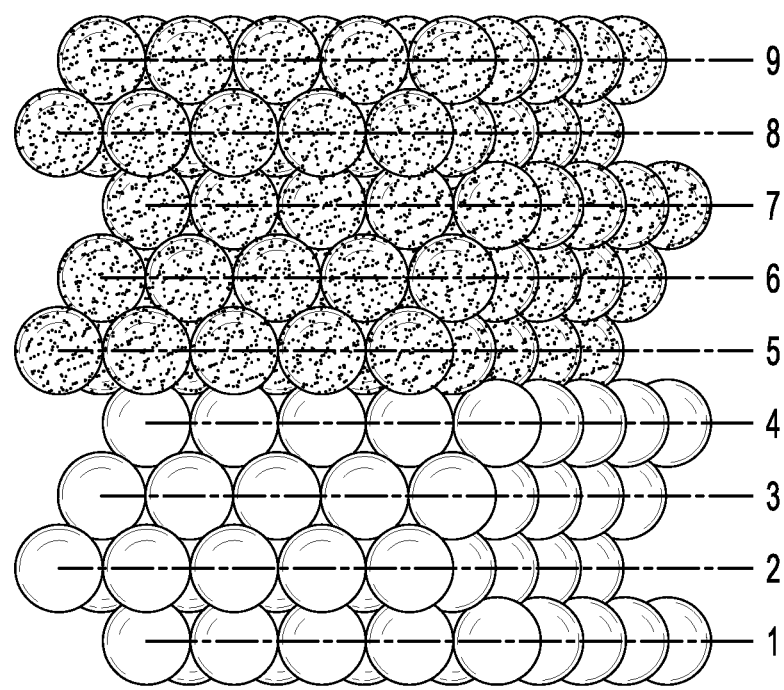
FIG. 6 show Pt/Ir stacking and interlayer distance values.

Analyzing the Pt/Ir catalyst from the Example 1. As shown in FIG. 6, Pt layer distance is about 2.4 angstroms for 1 to 5 layers. All Pt layers are laterally compressed to 2.72 Angstroms while layer distances may vary. Layer distance for the Ir layers is about 2.20 angstroms for 1 to 5 layers, wherein corresponding value for a bulk is about 2.25 angstroms. The Ir layers are not laterally compressed but are kept at their own lattice constant, with the two top layers of Ir being allowed to relax. With one Pt layer, the catalyst of 1Pt/Ir is about 2.25 angstrom, similar to Ir bulk. Four Ir layers are used for cell calculations. With 2 Pt layers and up, the Pt—Pt interlayer is about 2.30 angstrom, wherein lateral Pt compression may be compensated by the increase in Pt layers. Corresponding values are tabulated in Table 1.

TABLE 1

| nPt/Ir (111) | 0 | 1 | 2 | 3 | 4 | 5 | Pt@Ir (111) | Pt (111) |
|---|---|---|---|---|---|---|---|---|
| $D_{8-9}$(Å) | | | | | | 2.43 | | |
| $D_{7-8}$(Å) | | | | | 2.4 | 2.42 | | |
| $D_{6-7}$(Å) | | | | 2.38 | 2.33 | 2.36 | | |
| $D_{5-6}$(Å) | | | 2.38 | 2.35 | 2.33 | 2.32 | | |
| $D_{4-5}$(Å) | | 2.41 | 2.26 | 2.27 | 2.23 | 2.24 | | |
| $D_{3-4}$(Å) | 2.25 | 2.21 | 2.17 | 2.21 | 2.16 | 2.19 | 2.45 | 2.36 |
| $D_{2-3}$(Å) | 2.16 | 2.25 | 2.21 | 2.19 | 2.14 | 2.19 | 2.28 | 2.27 |
| $\Delta E_{sep}$ (eV/atom) | | 1.25 | 0.78 | 0.83 | 0.66 | 1.04 | | |

The un-filled areas in Table 1 indicate that corresponding information is not applicable and/or no appreciable data is available. The term $\Delta E_{sep}$(eV/atom) may refer to separation energy, the energy needed to break bonds and separate one monolayer from the top of the substrate. The term "D" may refer to the distance in Angstrom between layers. In this experiment, four monolayers of Ir are used, with the bottom two layers being fixed at bulk distance Without wanting to be limited to any particular theory, it is believed that catalytic activities may correlate with interactions between catalytic surfaces and their surrounding reactants or adsorbates such as oxygen. Desirable catalytic activities may correspond to a "give and take" balance between the surface interactions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A catalyst structure comprising:
   a substrate layer containing a bulk substrate material and a plurality of atomic substrate monolayers supported on the bulk substrate material; and
   a catalyst layer containing a plurality of atomic catalyst monolayers including at least first and second catalyst monolayers, the first catalyst monolayer supported on the plurality of atomic substrate monolayers, and the second catalyst monolayer being an exposed, surface monolayer.

2. The catalyst structure of claim 1, wherein the atomic distance between two adjacent atoms in one of the plurality of atomic catalyst monolayers is less than 2.77 angstroms.

3. The catalyst structure of claim 1, wherein the d-band center of the plurality of atomic catalyst monolayers is −2.1 eV to −2.25 eV.

4. The catalyst structure of claim 1, wherein the plurality of atomic catalyst layers includes 2 to 16 atomic layers.

5. The catalyst structure of claim 1, wherein the plurality of atomic catalyst layers includes 3 to 10 atomic layers.

6. The catalyst structure of claim 1, wherein the plurality of atomic catalyst monolayers consists of five atomic catalyst monolayers.

7. The catalyst structure of claim 1, wherein the plurality of atomic catalyst monolayers consists of four atomic catalyst monolayers.

8. A catalyst structure comprising:
   an iridium substrate layer containing a bulk substrate material and a plurality of atomic substrate monolayers supported on the bulk substrate material; and
   a platinum catalyst layer containing a plurality of atomic catalyst monolayers including at least first and second catalyst monolayers, the first catalyst monolayer supported on the plurality of atomic substrate monolayers, and the second catalyst monolayer being an exposed, surface monolayer.

9. The catalyst of claim 8, wherein the atomic distance between two adjacent atoms in one of the plurality of atomic catalyst monolayers is less than 2.77 angstroms.

10. The catalyst structure of claim 8, wherein the d-band center of the plurality of atomic catalyst monolayers is −2.1 eV to −2.25 eV.

11. The catalyst structure of claim 8, wherein the plurality of atomic catalyst layers includes 2 to 16 atomic layers.

12. The catalyst structure of claim 8, wherein the arrangement of the plurality of atomic platinum catalyst monolayers on the plurality of atomic iridium monolayers forms an (111) crystalline phase.

13. The catalyst structure of claim 8, wherein the arrangement of the plurality of atomic platinum catalyst monolayers on the plurality of atomic iridium monolayers forms an (110) or (100) crystalline facet.

14. The catalyst structure of claim 8, wherein platinum in the platinum catalyst layer is no less than 70 weight percent.

15. A catalyst structure comprising:
   an iridium substrate layer containing a bulk substrate material and a plurality of atomic substrate monolayers supported on the bulk substrate material; and
   a platinum catalyst layer containing first and second atomic catalyst monolayers, the first catalyst monolayer supported on the plurality of atomic substrate monolayers, and the second catalyst monolayer being an exposed, surface monolayer.

16. The catalyst structure of claim 15, wherein the atomic distance between two adjacent atoms in one of the plurality of atomic catalyst monolayers is less than 2.77 angstroms.

17. The catalyst structure of claim 15, wherein the d-band center of the plurality of atomic catalyst monolayers is −2.1 eV to −2.25 eV.

18. The catalyst structure of claim 15, wherein the arrangement of the first and second atomic platinum catalyst monolayers on the plurality of atomic iridium monolayers forms an (111) crystalline phase.

19. The catalyst structure of claim 15, wherein the arrangement of the first and second atomic platinum catalyst monolayers on the plurality of atomic iridium monolayers forms an (110) or (100) crystalline facet.

20. The catalyst structure of claim 15 having an oxygen binding energy of about 1.9 eV.

* * * * *